(12) United States Patent
Park et al.

(10) Patent No.: US 9,058,099 B2
(45) Date of Patent: Jun. 16, 2015

(54) TOUCH SCREEN DEVICE AND OPERATING METHOD THEREOF

(75) Inventors: Ho Joo Park, Seoul (KR); Ji Suk Chae, Seoul (KR); Young Ho Ham, Yongin (KR); Kyung Hee Yoo, Seoul (KR); Ji Ae Kim, Seoul (KR); Yu Mi Kim, Seongnam (KR); Sang Hyun Shin, Seoul (KR); Seung Jun Bae, Busan (KR); Yoon Hee Koo, Sacheon (KR); Seong Cheol Kang, Osan (KR)

(73) Assignee: LG ELECTRONICS INC., Seoul (KR)

( * ) Notice: Subject to any disclaimer, the term of this patent is extended or adjusted under 35 U.S.C. 154(b) by 2099 days.

(21) Appl. No.: 11/646,597

(22) Filed: Dec. 28, 2006

(65) Prior Publication Data

US 2007/0273663 A1 Nov. 29, 2007

(30) Foreign Application Priority Data

May 24, 2006 (KR) .......................... 10-2006-0046698

(51) Int. Cl.
*G06F 3/041* (2006.01)
*G06F 3/0488* (2013.01)

(52) U.S. Cl.
CPC ................................... *G06F 3/04883* (2013.01)

(58) Field of Classification Search
USPC ..................... 345/173–179; 178/18.01–18.07, 178/18.08–18.13; 715/863
See application file for complete search history.

(56) References Cited

U.S. PATENT DOCUMENTS

| 5,140,678 A | | 8/1992 | Torres |
| 5,191,645 A | * | 3/1993 | Carlucci et al. ................ 715/723 |
| 5,495,566 A | | 2/1996 | Kwatinetz |

(Continued)

FOREIGN PATENT DOCUMENTS

| AU | 2006330724 | 7/2007 |
| EP | 0604346 | 6/1994 |

(Continued)

OTHER PUBLICATIONS

Article by Greg Scoblete, Sandisk Introduces Flash Drives, MP3 Players, TWICE, Jan. 20, 2006, 21, 3; Research Library, p. 4.*

(Continued)

*Primary Examiner* — Charles V Hicks
*Assistant Examiner* — Jeffrey Steinberg
(74) *Attorney, Agent, or Firm* — Ked & Associates LLP (57) ABSTRACT

A touch screen device and an operating method are provided in which only a specific position on a touch screen is activated to receive signals. The touch screen device includes a screen including a display configured to display menu images thereon and a detector configured to detect a screen touch, and a controller configured to control operations of the device according to the screen touch detected by the detector. The controller may cause the detector to be divided into an execution area configured to execute a menu when the menu placed on the execution area is touched, and a selection area configured to sequentially move the menu images to the execution area when the selection area is touched. Alternatively, the controller may cause the detector to be divided into a moving area configured to move a menu from a touch point along a drag line while the menu is dragged, and an execution area configured to execute the relevant menu when the touch on the execution area is released. With a touch screen device so configured, the menus are executed only in a limited execution area.

13 Claims, 12 Drawing Sheets

(56) References Cited

U.S. PATENT DOCUMENTS

| | | | |
|---|---|---|---|
| 5,523,775 A | 6/1996 | Capps | |
| 5,526,011 A | 6/1996 | Hix et al. | |
| 5,548,705 A | 8/1996 | Moran et al. | |
| 5,559,944 A | 9/1996 | Ono | |
| 5,570,113 A | 10/1996 | Zetts | |
| 5,586,235 A | 12/1996 | Kauffman | |
| 5,592,608 A | 1/1997 | Weber et al. | |
| 5,596,699 A | 1/1997 | Driskell | |
| 5,757,368 A | 5/1998 | Gerpheide et al. | |
| 5,794,127 A | 8/1998 | Lansang | |
| 5,796,406 A | 8/1998 | Shigematsu et al. | |
| 5,821,936 A | 10/1998 | Shaffer et al. | |
| 5,831,616 A | 11/1998 | Lee | |
| 5,880,743 A | 3/1999 | Moran et al. | |
| 5,903,267 A | 5/1999 | Fisher | |
| 6,094,197 A | 7/2000 | Buxton et al. | |
| 6,097,387 A | 8/2000 | Sciammarella et al. | |
| 6,107,997 A | 8/2000 | Ure | |
| 6,121,960 A | 9/2000 | Carroll et al. | |
| 6,259,436 B1 | 7/2001 | Moon et al. | |
| 6,310,615 B1 | 10/2001 | Davis et al. | |
| 6,334,003 B1 | 12/2001 | Yokota | |
| 6,414,700 B1 | 7/2002 | Kurtenbach et al. | |
| 6,433,801 B1* | 8/2002 | Moon et al. | 715/840 |
| 6,459,442 B1 | 10/2002 | Edwards et al. | |
| 6,476,796 B1 | 11/2002 | Kuzunuki et al. | |
| 6,525,749 B1 | 2/2003 | Moran et al. | |
| 6,560,281 B1 | 5/2003 | Black et al. | |
| 6,618,063 B1 | 9/2003 | Kurtenbach | |
| 6,724,370 B2* | 4/2004 | Dutta et al. | 345/169 |
| 6,738,050 B2 | 5/2004 | Comiskey et al. | |
| 6,753,892 B2 | 6/2004 | Chung | |
| 6,765,557 B1 | 7/2004 | Segal et al. | |
| 6,883,140 B1* | 4/2005 | Acker et al. | 715/730 |
| 6,883,145 B2 | 4/2005 | Jaeger | 715/767 |
| 6,900,835 B2 | 5/2005 | Cazier et al. | |
| 6,915,492 B2 | 7/2005 | Kurtenbach et al. | |
| 6,940,494 B2* | 9/2005 | Hoshino et al. | 345/173 |
| 6,957,395 B1 | 10/2005 | Jobs et al. | |
| 6,958,749 B1* | 10/2005 | Matsushita et al. | 345/175 |
| 6,965,377 B2 | 11/2005 | Yanagisawa et al. | |
| 7,015,932 B1 | 3/2006 | Koike et al. | |
| 7,031,756 B1 | 4/2006 | Sim et al. | |
| 7,035,720 B2 | 4/2006 | Taxis | |
| 7,046,230 B2* | 5/2006 | Zadesky et al. | 345/156 |
| 7,047,503 B1 | 5/2006 | Parrish et al. | |
| 7,158,913 B2 | 1/2007 | Park et al. | |
| 7,162,685 B2* | 1/2007 | Saito | 714/813 |
| 7,164,410 B2 | 1/2007 | Kupka | |
| 7,164,432 B1 | 1/2007 | Amemiya | |
| 7,242,323 B2* | 7/2007 | Sato et al. | 341/33 |
| 7,345,671 B2 | 3/2008 | Robbin et al. | |
| 7,348,967 B2 | 3/2008 | Zadesky et al. | 345/173 |
| 7,406,666 B2 | 7/2008 | Davis et al. | |
| 7,434,177 B1 | 10/2008 | Ording et al. | |
| 7,456,823 B2 | 11/2008 | Poupyrev et al. | |
| 7,469,388 B1 | 12/2008 | Baudisch et al. | |
| 7,486,279 B2 | 2/2009 | Wong et al. | |
| 7,509,588 B2* | 3/2009 | Van Os et al. | 715/835 |
| 7,898,529 B2 | 3/2011 | Fitzmaurice et al. | |
| 2001/0019374 A1 | 9/2001 | Izumi et al. | |
| 2002/0011990 A1 | 1/2002 | Anwar | |
| 2002/0015064 A1 | 2/2002 | Robotham et al. | |
| 2002/0103616 A1 | 8/2002 | Park et al. | |
| 2002/0149569 A1 | 10/2002 | Dutta et al. | |
| 2002/0149605 A1 | 10/2002 | Grossman | |
| 2002/0158920 A1 | 10/2002 | Abrams | |
| 2003/0076306 A1 | 4/2003 | Zadesky et al. | |
| 2003/0142123 A1 | 7/2003 | Malamud et al. | |
| 2003/0174149 A1 | 9/2003 | Fujisaki et al. | |
| 2003/0234772 A1 | 12/2003 | Zhang et al. | |
| 2004/0056839 A1 | 3/2004 | Yoshihara | |
| 2004/0095395 A1 | 5/2004 | Kurtenbach | |
| 2004/0100479 A1 | 5/2004 | Nakano et al. | |
| 2005/0003851 A1 | 1/2005 | Chrysochoos | |
| 2005/0024322 A1 | 2/2005 | Kupka | |
| 2005/0024341 A1 | 2/2005 | Gillespie et al. | |
| 2005/0047629 A1 | 3/2005 | Farrell et al. | |
| 2005/0176502 A1 | 8/2005 | Nishimura et al. | |
| 2005/0193017 A1 | 9/2005 | Kim | |
| 2005/0193351 A1 | 9/2005 | Huoviala | |
| 2005/0251748 A1 | 11/2005 | Gusmorino et al. | |
| 2006/0013079 A1 | 1/2006 | Rekimoto | |
| 2006/0026535 A1 | 2/2006 | Hotelling et al. | |
| 2006/0026536 A1* | 2/2006 | Hotelling et al. | 715/863 |
| 2006/0075250 A1 | 4/2006 | Liao | |
| 2006/0085767 A1 | 4/2006 | Hinckley et al. | |
| 2006/0159279 A1 | 7/2006 | Kuo et al. | |
| 2006/0256091 A1* | 11/2006 | Hino | 345/173 |
| 2006/0271947 A1 | 11/2006 | Lienhart et al. | |
| 2007/0018968 A1* | 1/2007 | Iwamoto et al. | 345/173 |
| 2007/0030257 A1 | 2/2007 | Bhogal et al. | |
| 2007/0033539 A1* | 2/2007 | Thielman et al. | 715/769 |
| 2007/0075980 A1* | 4/2007 | Hsieh et al. | 345/173 |
| 2007/0125860 A1 | 6/2007 | Lapstun et al. | |
| 2007/0136690 A1 | 6/2007 | MacLaurin et al. | |
| 2007/0146544 A1 | 6/2007 | Liu et al. | |
| 2007/0150842 A1 | 6/2007 | Chaudhri et al. | |
| 2007/0180392 A1 | 8/2007 | Russo | |
| 2007/0273663 A1 | 11/2007 | Park et al. | |
| 2008/0150905 A1 | 6/2008 | Grivna et al. | |
| 2008/0282158 A1 | 11/2008 | Aaltonen et al. | |
| 2009/0119613 A1 | 5/2009 | Nakaya | |

FOREIGN PATENT DOCUMENTS

| | | |
|---|---|---|
| EP | 1 028 570 | 8/2000 |
| EP | 1 037 135 | 9/2000 |
| GB | 2329813 | 3/1999 |
| JP | 05-158616 | 6/1993 |
| JP | 2002041242 | 2/2002 |
| TW | 580636 | 3/2004 |
| TW | 580652 | 3/2004 |
| TW | 583552 | 4/2004 |
| TW | 200406734 | 5/2004 |
| TW | 200410853 | 7/2004 |
| TW | I236630 | 7/2005 |
| TW | M282290 | 12/2005 |
| WO | WO 00/38042 | 6/2000 |
| WO | WO 00/75766 | 12/2000 |
| WO | WO2005/073954 | 8/2005 |

OTHER PUBLICATIONS

SanDisk Sansa™ e200 User Guide.*
Greg Scoblete, Sandisk Introduces Flash Drives, MP3 Players, TWICE, Jan. 20, 2006, 21, 3; Research Library, p. 4.*
Indian Office Action dated Nov. 16, 2009.
Office Action dated Nov. 13, 2009 for U.S. Appl. No. 11/646,613.
Office Action dated Nov. 13, 2009 for U.S. Appl. No. 11/785,405.
Office Action dated Oct. 20, 2009 for U.S. Appl. No. 11/646,604.
Office Action dated Sep. 18, 2009 for U.S. Appl. No. 11/646,586.
Office Action dated Nov. 3, 2009 for U.S. Appl. No. 11/785,402.
Office Action dated Nov. 13, 2009 for U.S. Appl. No. 11/646,587.
Office Action dated Dec. 4, 2009 for U.S. Appl. No. 11/785,401.
Taiwanese Office Action issued in TW Application No. 095147947 dated Dec. 29, 2009 (translation).
U.S. Office Action issued in U.S. Appl. No. 11/785,400 dated Feb. 4, 2010.
U.S. Office Action issued in U.S. Appl. No. 11/646,598 dated Feb. 26, 2010.
U.S. Office Action issued in U.S. Appl. No. 11/646,613 dated Feb. 2, 2010, superceded by Office Action issued Mar. 8, 2010.
U.S. Office Action issued in U.S. Appl. No. 11/646,586 dated Mar. 10, 2010.
U.S. Office Action issued in U.S. Appl. No. 11/646,585 dated Mar. 18, 2010.
Andrew Sears and Ben Shneiderman Split menus: Effectively using selection frequency to organize menus ACM Transactions on Computer-Human Interaction, vol. 1, No. 1, Mar. 1994, pp. 27-51.
Final U.S. Office Action issued in U.S. Appl. No. 11/785,399 dated Nov. 16, 2010.

(56) References Cited

OTHER PUBLICATIONS

Final U.S. Office Action issued in U.S. Appl. No. 11/785,405 dated Nov. 22, 2010.
Supplemental Final U.S. Office Action issued in U.S. Appl. No. 11/785,399 dated Jan. 4, 2011.
U.S. Office Action issued in U.S. Appl. No. 11/646,613 dated Jan. 6, 2011.
U.S. Office Action issued in U.S. Appl. No. 11/646,585 dated Jan. 13, 2011.
Notice of Allowance issued in U.S. Appl. No. 11/646,598 dated Feb. 14, 2011.
U.S. Office Action issued in U.S. Appl. No. 11/785,404 dated Mar. 1, 2011.
U.S. Office Action issued in U.S. Appl. No. 11/646,613 dated Mar. 7, 2011.
U.S. Office Action issued in U.S. Appl. No. 11/785,399 dated Mar. 16, 2011.
U.S. Office Action issued in U.S. Appl. No. 11/646,585 dated Jul. 21, 2011.
European Search Report dated Aug. 19, 2011. (07100272.9-1527).
U.S. Office Action issued in U.S. Appl. No. 11/785,404 dated Aug. 30, 2011.
U.S. Office Action issued in U.S. Appl. No. 12/363,379 dated Sep. 14, 2011.
European Search Report dated Oct. 8, 2012.
U.S. Office Action issued in U.S. Appl. No. 11/785,403 dated Dec. 21, 2011.
U.S. Notice of Allowance issued in U.S. Appl. No. 11/646,585 dated Dec. 28, 2011.
U.S. Office Action issued in U.S. Appl. No. 11/646,587 dated Jan. 6, 2012.
U.S. Office Action issued in U.S. Appl. No. 11/785,401 dated Jan. 24, 2012.
U.S. Office Action issued in U.S. Appl. No. 11/785,404 dated Apr. 11, 2012.
Indian Office Action dated May 14, 2010. (101/MUM/2007).
Taiwanese Office Action dated Jun. 15, 2010.
U.S. Office Action U.S. Appl. No. 11/646,598 dated Aug. 2, 2010.
U.S. Office Action U.S. Appl. No. 11/646,613 dated Aug. 4, 2010.
European Search Report for EP 07 10 0400 dated Oct. 20, 2010.
U.S. Office Action for U.S. Appl. No. 11/785,403 dated Jan. 7, 2010.
Taiwan Office Action dated Jun. 8, 2010.
Taiwan Office Action dated Jun. 9, 2010.
U.S. Notice of Allowance U.S. Appl. No. 11/646,586 dated Jun. 13, 2010.
U.S. Office Action issued in U.S. Appl. No. 11/785,404 dated Mar. 25, 2010.
Article by Greg Scoblete, Sandisk Introduces Flash Drives. MP3 Players, TWICE, Jan. 30, 2006, 21, 3; Research Library, p. 4.
U.S. Notice of Allowance issued in U.S. Appl. No. 11/785,402 dated Mar. 25, 2010.
U.S. Office Action issued in U.S. Appl. No. 11/785,399 dated Apr. 1, 2010.
U.S. Office Action issued in U.S. Appl. No. 11/785,403 dated May 12, 2010.
U.S. Office Action issued in U.S. Appl. No. 11/785,405 dated Jun. 4, 2010.
U.S. Office Action U.S. Appl. No. 11/785,404 dated Sep. 1, 2010.
U.S. Office Action U.S. Appl. No. 11/646,585 dated Sep. 16, 2010.
Taiwan Office Action dated Aug. 27, 2010 (Application No. 095147944).
U.S. Office Action issued in U.S. Appl. No. 11/785,403 dated Oct. 25, 2010.
U.S. Office Action issued in U.S. Appl. No. 11/785,405 dated Jun. 7, 2011.
U.S. Office Action issued in U.S. Appl. No. 11/785,403 dated Jun. 22, 2011.

* cited by examiner

TOUCH SCREEN DEVICE AND OPERATING METHOD THEREOF

BACKGROUND

1. Field

A touch screen device and operating method thereof are disclosed herein.

2. Background

Recently, most portable information terminals have been provided as intelligent or multi-functional terminals that can process a variety of multimedia information, such as music, games, photographs, and videos, rather than provide only a specific single function. Further, each of the portable information terminals is provided with a variety of key buttons capable of easily selecting and executing the aforementioned functions. However, since portable information terminals are small enough to be easily carried, there are difficulties in configuring a portable information terminal capable of providing all the key buttons for executing the functions.

Therefore, the latest digital portable information terminals allow a user to more conveniently input and process necessary information by employing a touch screen as a user interface. That is, since the size of a display should be maximized within a limited size thereof, the data input is generally implemented as a touch screen with which a finger or stylus pen is used.

In this way, touch screen input, which considerably increases user convenience in comparison with inputting user information through conventional key buttons, is widely employed as the user information input device and recently has been applied to most portable information terminals. Since the touch screen method allows all processes for performing specific functions to be executed on a touch screen after power is turned on, the functions of the portable information terminal can be sufficiently performed even though no input buttons are provided.

However, icons displayed on the touch screen should be selected to use the portable information terminal. At this time, it is difficult to touch a desired icon with a finger if the size of the touch screen of the portable information terminal is small. That is, this is not a problem for portable information terminals having large screens, however, there is a high probability that finger touch errors will be generated where the portable information terminals are small in size, such as MP3 players, portable multimedia players (PMPs), and personal digital assistants (PDAs). In other words, in the case of a portable information terminal having a small screen, icons are densely arranged on the screen of the portable information terminal. Therefore, it is inconvenient for a user to select and input necessary information. Further, it is contradictory to the fact that a touch screen is employed as an input means to improve the user convenience.

BRIEF DESCRIPTION OF THE DRAWINGS

Embodiments will be described in detail with reference to the following drawings in which like reference numerals refer to like elements wherein.

DETAILED DESCRIPTION

Hereinafter, embodiments will be described in detail with reference to the accompanying drawings. Herein, like elements are designated by like reference numerals.

The touch screen device according to embodiments may be applied to all kinds of digital equipment to which a touch screen device is mounted, such as a MP3 player, a portable media player, a PDA, a portable terminal, a navigation system, or a notebook computer. Moreover, the touch screen device according to embodiments may be used with electronic books, newspapers, magazines, etc., different types of portable devices, for example, handsets, MP3 players, notebook computers, etc., audio applications, navigation applications, televisions, monitors, or other types of devices using a display, either monochrome or color. For convenience of explanation, an exemplary MP3 player will be described herein by way of example. Further, touch can include any type of direct or indirect touch or contact, using, for example, a finger or stylus.

Figure 1:
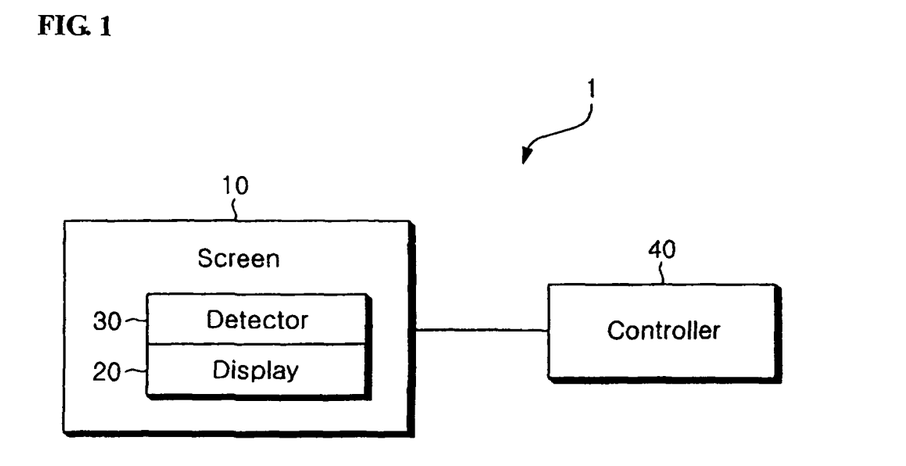
FIG. 1 is a block diagram of a touch screen device according to an embodiment.

FIG. 1 is a block diagram of a touch screen device according to an embodiment. As shown in FIG. 1, the touch screen device 1 may comprise a screen 10 having a function of inputting and displaying information. The screen 10 may comprise a display 20 for displaying a plurality of menu information (icons, etc.) and data thereon, and a detector 30 for detecting a touching action to select menus 50 or data displayed on the display 20. When the screen 10 is touched to select the menus 50 or data displayed on the display 20 using, for example, a finger 60 or a stylus pen, the detector 30 may detect whether the screen 10 has been touched.

The display 20 may be, for example, a liquid crystal display (LCD), a plasma display panel (PDP), a light emitting diode (LED), or an organic light emitting diode (OLED). In one embodiment, the detector unit 30 is a thin layer provided on a front surface of the display 20, which employs a resistive or capacitive method. However, alternatively, other touch screens such as touch screens that utilize infrared rays may also be employed.

In the case of a resistive touch screen, the touch screen may be configured in such a manner that two layers coated with resistive materials are provided which are kept at a constant interval and electric currents are supplied to both the layers. If pressure is applied to a layer so that it comes into contact with another layer, an amount of electric current flowing along the layers may be changed and a touch point thus detected by the change in electric current. In contrast, in the case of a capacitive touch screen, the touch screen may be configured in such a manner that both surfaces of glass are coated with conductive metal and electric voltage is applied to edges of the glass. In such a case, high frequencies flow along the surface of the touch screen and a high frequency waveform may be distorted when a finger is touched on the surface of the touch screen, and a touch point detected by the change in the waveform.

The screen 10 may be connected to a controller 40 that controls an access command corresponding to the menu 50 selected according to the detection results of the detector 30 or data, such as additional information or messages to be described below from a storage device, and thus, the display of the command or data onto the screen 10.

The controller 40 may control not only the display 20 but may also control the overall operation of the digital equipment. Further, the controller 40 may operate the digital equipment according to the detection results of the detector 30.

Figure 4A:
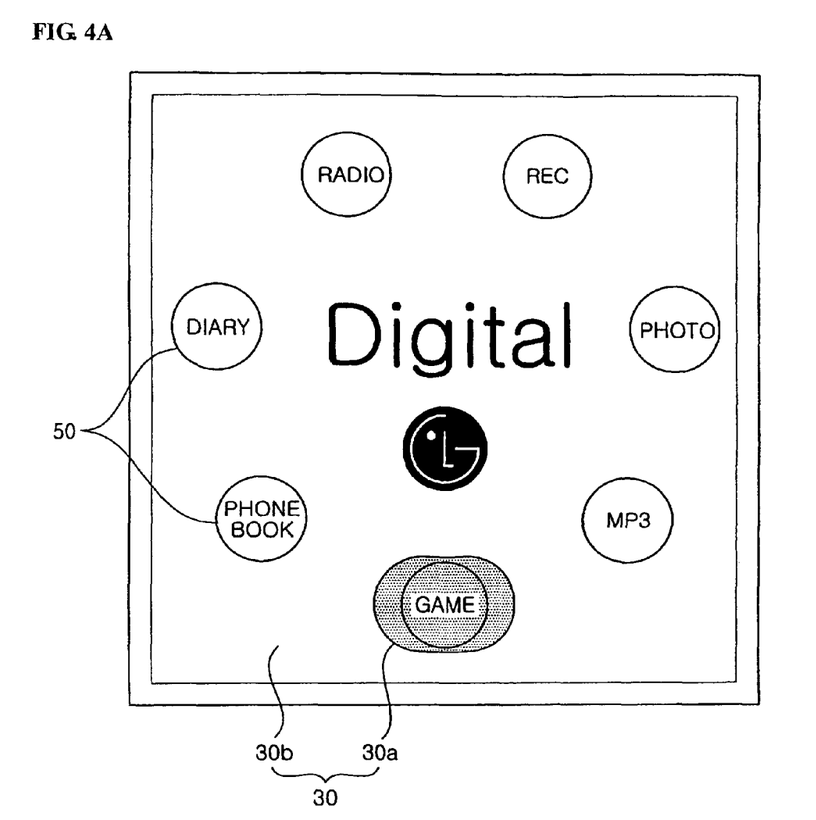
FIGS. 4A to 4C are exemplary views illustrating operations of a touch screen device according to an embodiment.
Figure 4B:
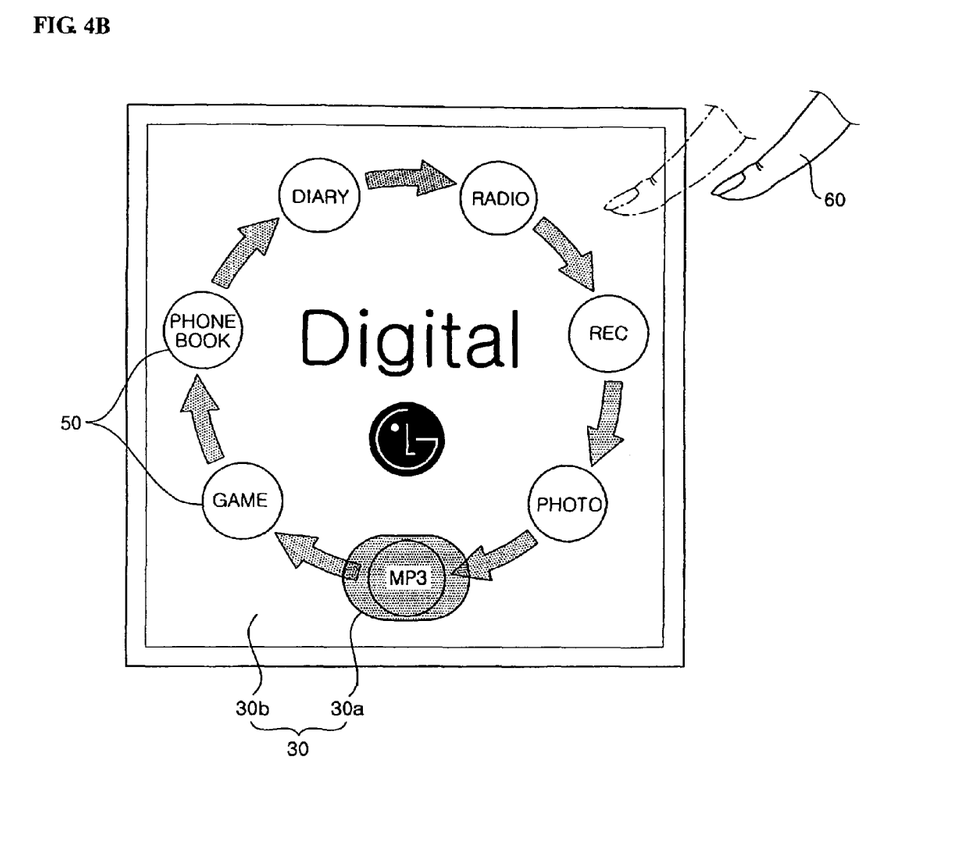
Figure 4C:
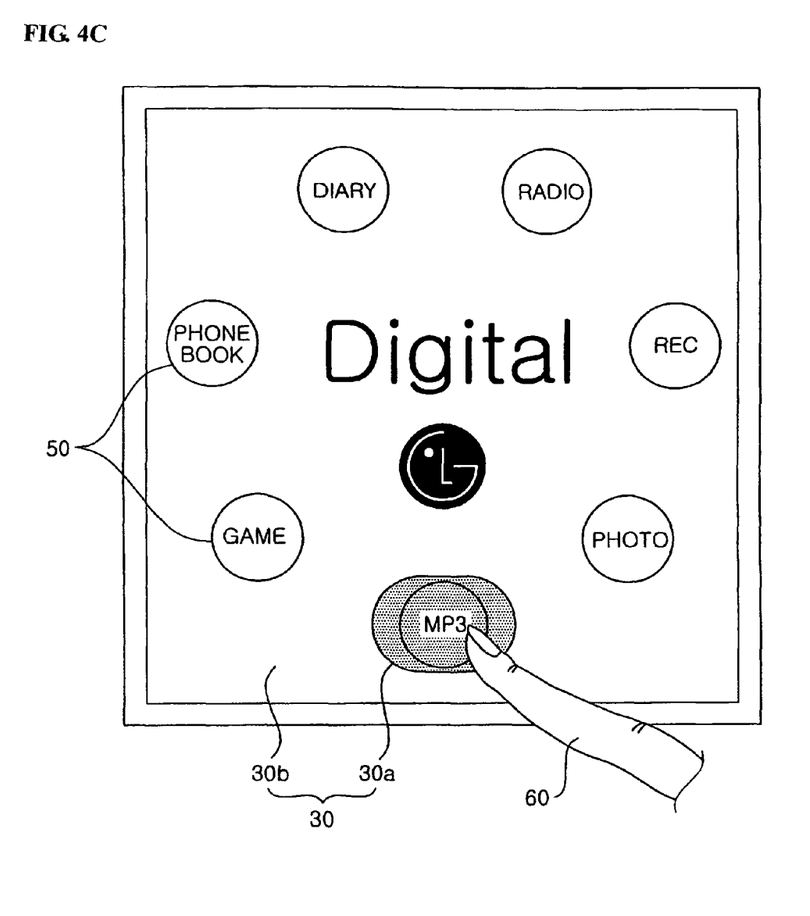

According to one embodiment, the controller 40 allows the detector 30 to be divided into two portions. That is, referring to FIGS. 3A-3C, the controller 40 may assign one portion of the detector 30 as an execution area 30a. The execution area 30a may be an area in which the menu 50 corresponding to a touch is executed. The other portion may be assigned as a selection area 30b. The selection area 30b may be an area in which when the touch is detected, the displayed menus 50 are sequentially moved to the execution area 30a.

That is, the controller 40 may execute a corresponding menu 50 when a touch is detected at a coordinate corresponding to the execution area 30a and move the menus 50 to the execution area 30a when a touch is detected at a coordinate corresponding to the selection area 30b. In one embodiment, the controller 40 may continuously move the menus 50 while the touch is maintained on the selection area 30b.

Figure 2:
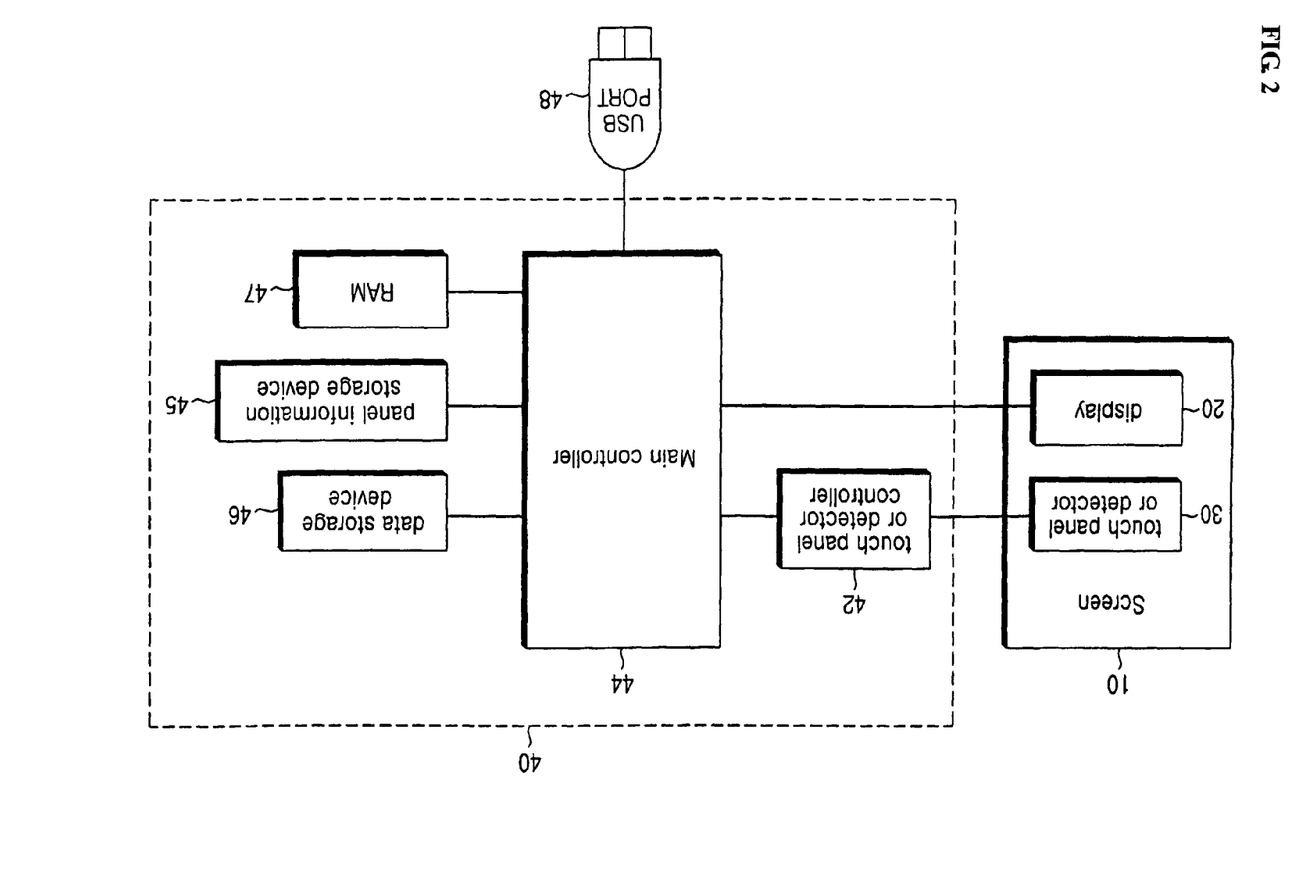
FIG. 2 is a block diagram of a touch screen device according to an embodiment described in more detail.

In FIG. 2, a touch screen device according to an embodiment is described in more detail. As shown in FIG. 2, the screen 10 may comprise a touch screen or detector 30 and a display 20. In one embodiment, a thin film transistor liquid crystal display (TFT-LCD) may be used as the display 20. The touch screen or detector 30 may be connected to a touch panel or detector controller 42 for signalizing a touch detected on the touch screen or detector 30. The display 20 and the touch screen or detector controller 42 may be connected to and operated under the control of a main controller 44.

Further, a panel information storage device 45 for storing partition information of the touch screen or detector 30 may be connected to the main controller 44. In one embodiment, the partition information stored in the panel information storage device 45 may be classified by operation mode and contains information indicative of whether a specific position on the touch screen or detector 30 is included in a selection or moving area or an execution area. Accordingly, the information on whether the respective positions are included in the execution area or the selection or moving area on the basis of coordinate axes may be stored by mode.

Furthermore, a data storage device 46 for storing, for example, MP3 files may be connected to the main controller 44. For example, a NAND memory capable of rapidly and easily storing and reading out a large amount of information may be used as the data storage device 46.

A portion of the data storage device 46 may be used as the panel information storage device 45. However, use of a separate panel information storage device 45 constructed of a NOR memory that is relatively superior in the stability of information may be advantageous.

In addition, a universal serial bus (USB) port 48 serving as an interface for modifying data may be connected to the main controller 44. The USB port 48 may be connected to an external device such that the partition information and data stored in the data storage device 46 may be updated, deleted, or modified.

Moreover, the main controller 44 may be provided with a random access memory (RAM) 47 for driving the display device, for which a synchronous dynamic RAM (SDRAM) is may be used.

Hereinafter, the operation of a touch screen device according to an embodiment will be described in detail according to the execution method.

Figure 3:
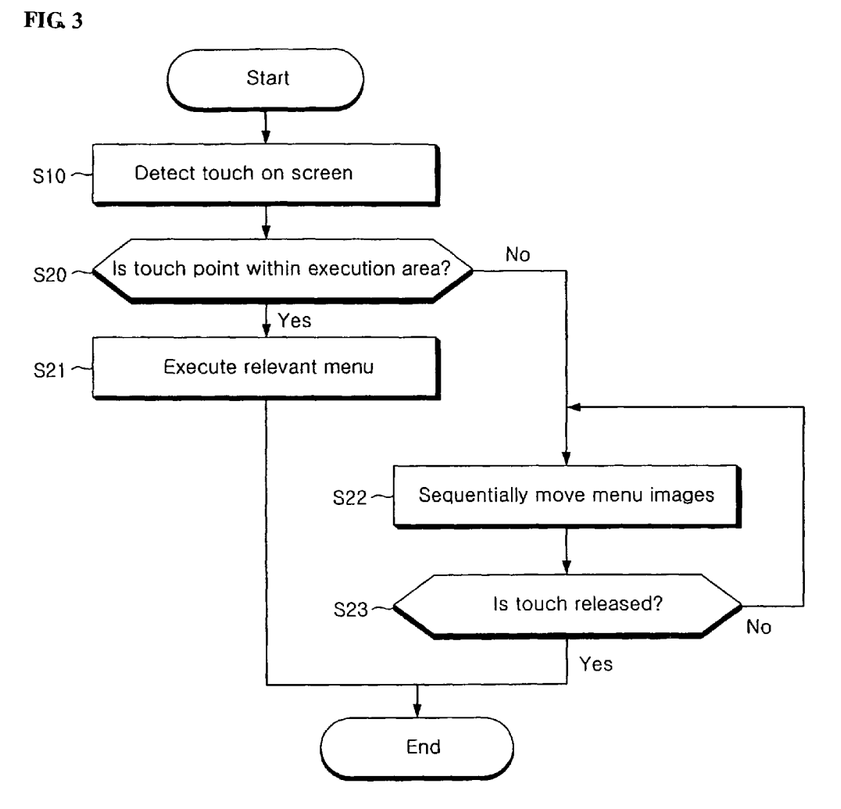
FIG. 3 is a flowchart of a method of operating a touch screen device according to an embodiment.

FIG. 3 is a flowchart of a method of operating a touch screen device according to an embodiment. As shown in FIG. 3, the operation of the touch screen starts from detecting a screen touch by the detector 30, in step S10.

If the detector 30 detects a touch on the screen 10, the controller 40 may determine whether the touch point is within the execution area 30a, in step S20. The execution area 30a and the selection area 30b may be set beforehand and stored. If the touch point is within the execution area 30a, the controller 40 may execute a menu 50 corresponding to the touch point, in step S21. If the touch point is within the selection area 30b, that is, the portions outside the execution area 30a, the controller 40 may sequentially move images of the menus 50 displayed on the display 10 such that the menus can be positioned within the execution area 30a, in step S22.

The controller 40 may check whether the touch is released after moving the images of the menus 50, in step S23. Then, if the touch is released, the controller 40 may terminate the operation and wait for a new touch input. However, if the touch is not released, the controller 40 may repeatedly perform the steps of sequentially moving the images of the menus 50 and then checking whether the touch has been released. The reason is that the images of the menus 50 may be moved by a desired number of times by continuously maintaining a single touch instead of performing several touches several times when a user intends to move the images of the menus 50 several times.

Next, operation of an embodiment so configured will be explained from the viewpoint of a user.

FIGS. 4A to 4C illustrating the operation of an embodiment according to input of a user.

FIG. 4A shows an example in which the execution area 30a is located at the lower center of the screen 10 and the menus 50 are arranged in the form of a circle with the center positioned at the center of the screen 10. In this state, a user determines a desired menu 50 that the user wishes to execute. For example, when the user wishes to operate an MP3 player, the user may position the "MP3" menu 50 on the execution area 30a. However, since the "GAME" menu 50 is currently positioned on the execution area 30a, the menus 50 should be moved.

Accordingly, the user touches the selection area 30b of the screen 10. FIG. 4B shows that the user touches the selection area 30b. Thus, the menus 50 rotate clockwise, and the "MP3" menu 50 is positioned on the execution area 30a. If a user wishes to record, he/she may continuously touch the selection area 30b until the "REC" menu 50 is positioned on the execution area 30a. After a desired menu 50 has been positioned on the execution area 30a, the user may merely touch the execution area 30a. When the execution area 30a is touched, the controller 40 may execute the relevant menu 50 positioned on the execution area 30a. In this example, the operation mode is changed to an "MP3" mode.

Next, the configuration, operation, and illustration of another embodiment will be described in comparison with those of the previous embodiment with reference to FIGS. 5 to 6D.

First, this embodiment may have the same configuration as the previously described embodiment shown in FIG. 1. Only the functions of the controller 40 may be different.

The controller 40 according to this embodiment may allow the detector 30 to be divided into a moving area 30d and an execution area 30c. When a user touches and moves (hereinafter, referred to as 'drags') the menu 50, the moving area 30d may allow an image of the touched menu 50 to be moved along a drag line. Further, the execution area 30*c* may allow the relevant menu 50 to be executed when the touch is released.

Hereinafter, operation of the embodiment shown in FIGS. 5 to 6D will be described with respect to the execution order.

Figure 5:
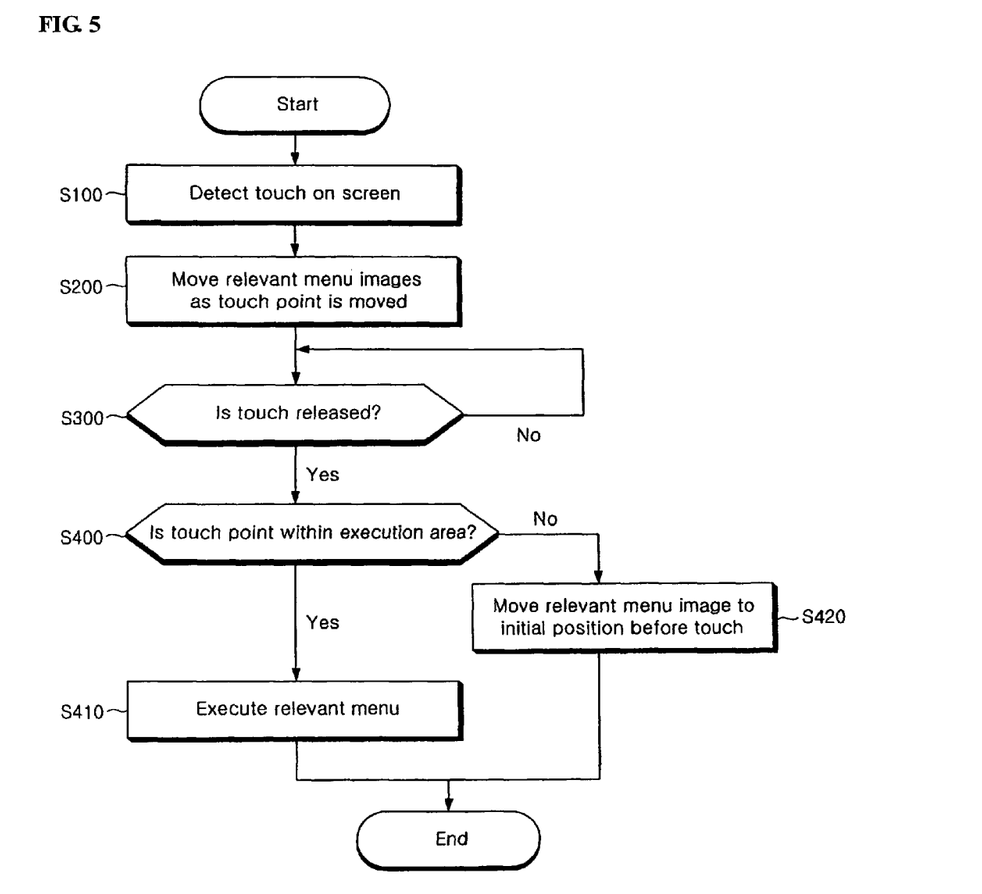
FIG. 5 is a flowchart illustrating a method of operating a touch screen device according to another embodiment.

As shown in FIG. 5, this exemplary embodiment may also be operated when the detector 30 detects a touch on the screen 10, in step S100. Then, the detector 30 may also detect a drag line along which the touch is moved. The controller 40 may cause a position of the image of the relevant menu 50 to move along the drag line. That is, the image of the menu 50 may be moved as a touch point is changed, in step S200.

Thereafter, the detector 30 may detect whether the touch is released, in step S300. In one embodiment, the relevant menu 50 may be executed when the touch is released. The release of the touch may be detected to determine whether the relevant menu 50 will be executed.

If the touch is not released, the touching action may be considered to be maintained. Thus, the detector 30 may wait until the touch is released. Only after the touch has been released, the detector 30 may determine whether a release point is on or within the execution area 30*c* step S400.

If the release point is on the execution area 30*c*, the controller 40 may execute the relevant menu 50 and then wait for the input of the next touch signal, in step S410. However, if the release point is not on or within the execution area 30*c* but on the moving area 30*d*, the controller 40 may not execute the relevant menu 50. In addition, the controller 40 may return the relevant menu 50 to a position before the touch is made, and the controller 40 may also wait for the input of the next touch signal, in step S420. Therefore, if a user recognizes the touch of a wrong menu 50 while dragging the desired menu 50, he/she may stop dragging the relevant menu within the moving area 30*d* to cancel the execution of the relevant menu 50 such that the relevant menu can be returned to its initial state.

Next, the operation of the embodiment so configured will be explained from the viewpoint of a user, referring to FIGS. 6A to 6D.

Figure 6A:
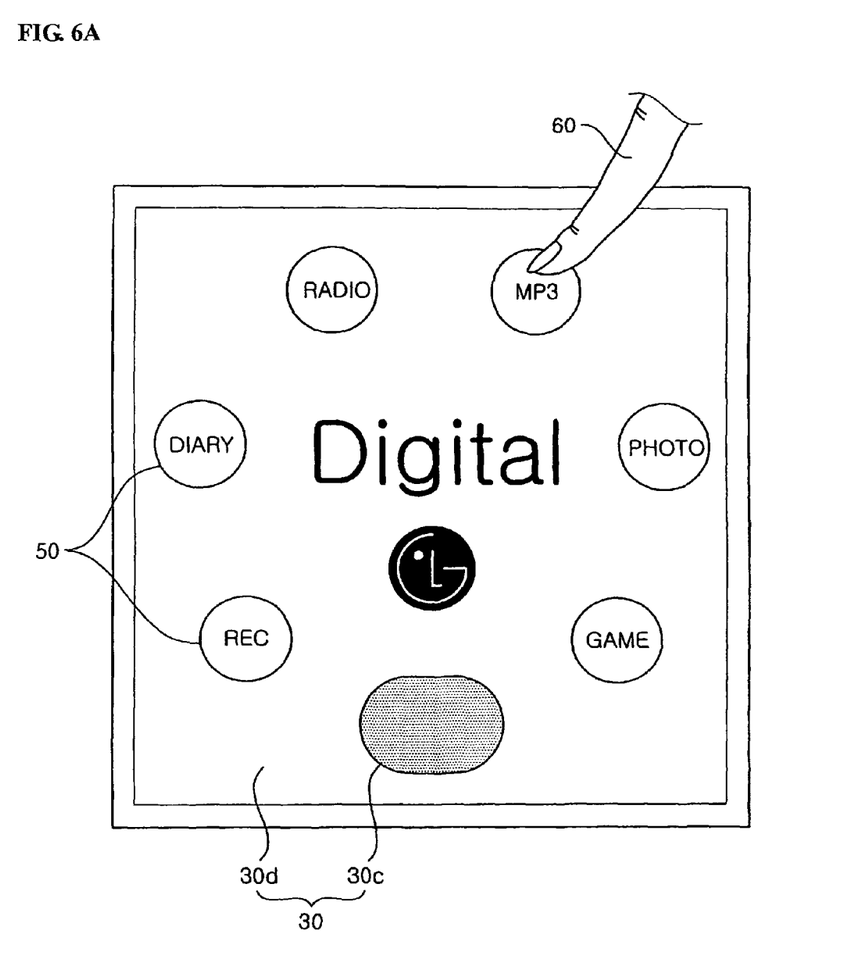
FIGS. 6A to 6D are exemplary views illustrating operations of a touch screen device according to an embodiment.

As shown in FIG. 6A, a user who intends to execute the menu 50 first touches the menu 50 that the user wishes to select. FIG. 6A shows a case in which a user wishes to execute the "MP3" menu 50.

Figure 6B:
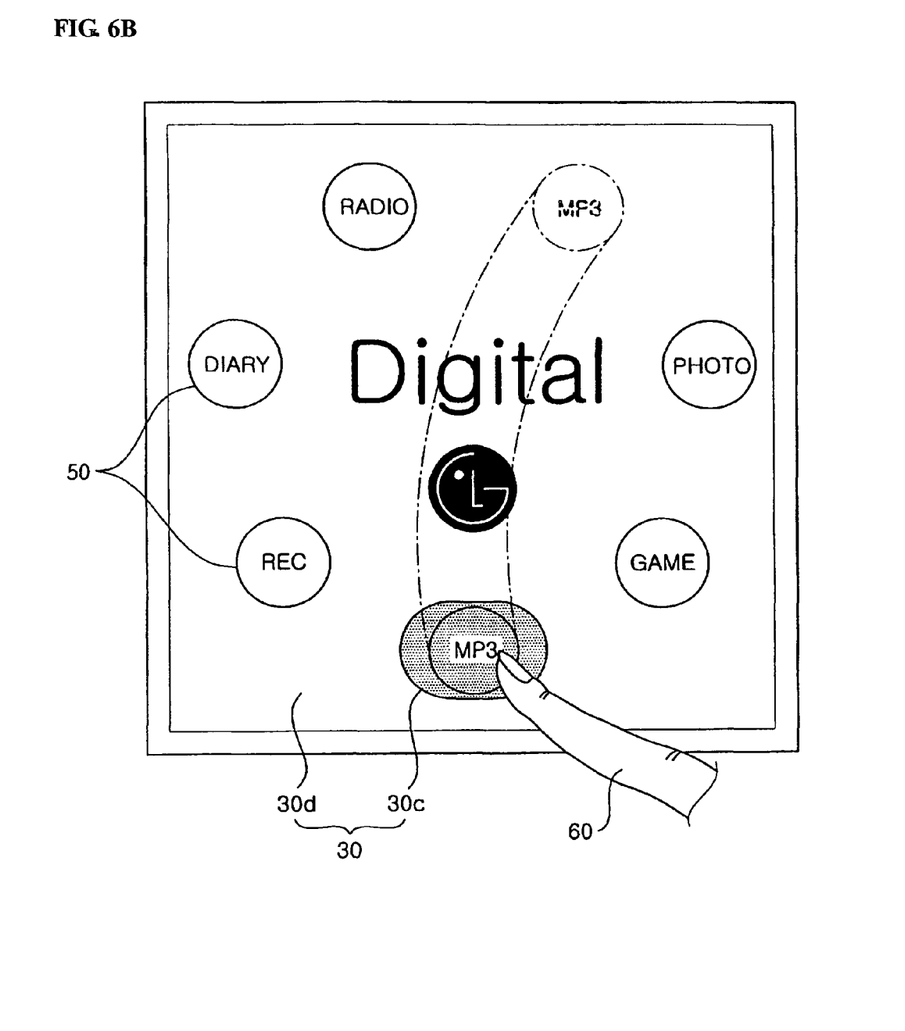
Figure 6C:
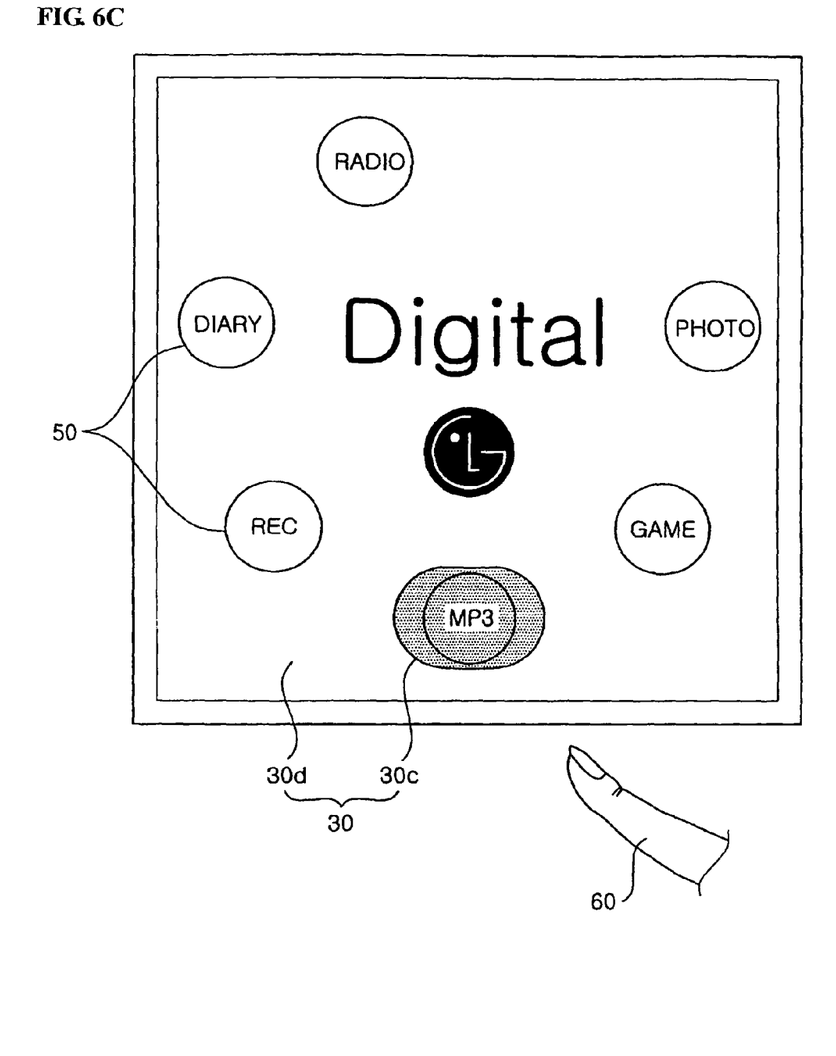
Figure 6D:
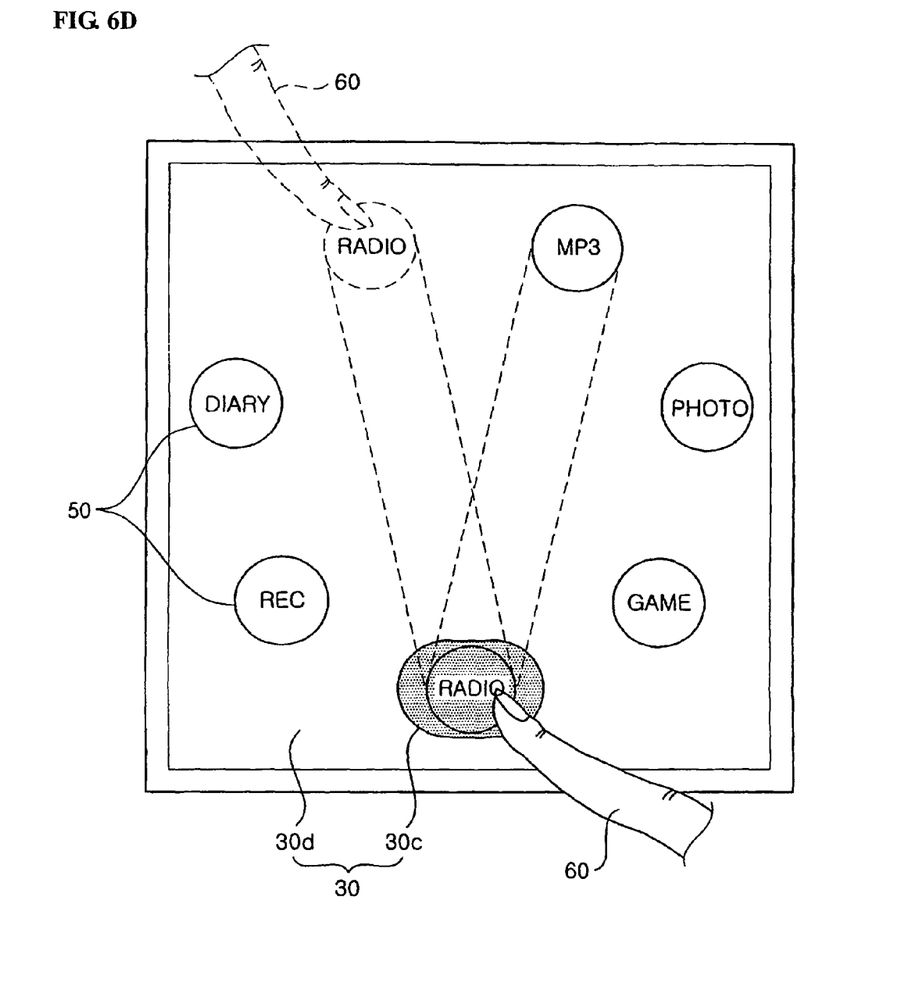

Then, as shown in FIG. 6B, the user may drag the relevant menu 50 from the touch point to the execution area 30*c*. Next, as shown in FIG. 6C, if the touch is released from the execution area 30*c*, the corresponding menu 50 may be executed. Further, in a case where the user does not wish to execute the menu 50 while dragging the relevant menu 50, he/she may merely release the touch from the moving area 30*d*.

In addition, as shown in FIG. 6C, if the other menu is dragged and placed at the execution position while an MP3 play mode is operated, the previous menu may be terminated and an icon indicative of the previous menu may be simultaneously returned to its original position. For example, as shown in FIG. 6D, if a user drags an icon representing a radio listening mode into the execution area while the MP3 play mode is operated, the icon representing the MP3 play mode may be returned to its original position and the radio listening mode executed.

Embodiments of the invention may be executed according to an operation mode. That is, in an operation mode in which a menu 50 is selected and executed, the area of the detector 30 may be divided as described above. However, in an operation mode other than the selection of the menu 50, the entire detector 30 may be activated and used.

In the above description, the execution area is set as a fixed position. However, the execution area may be movable.

Figure 7:
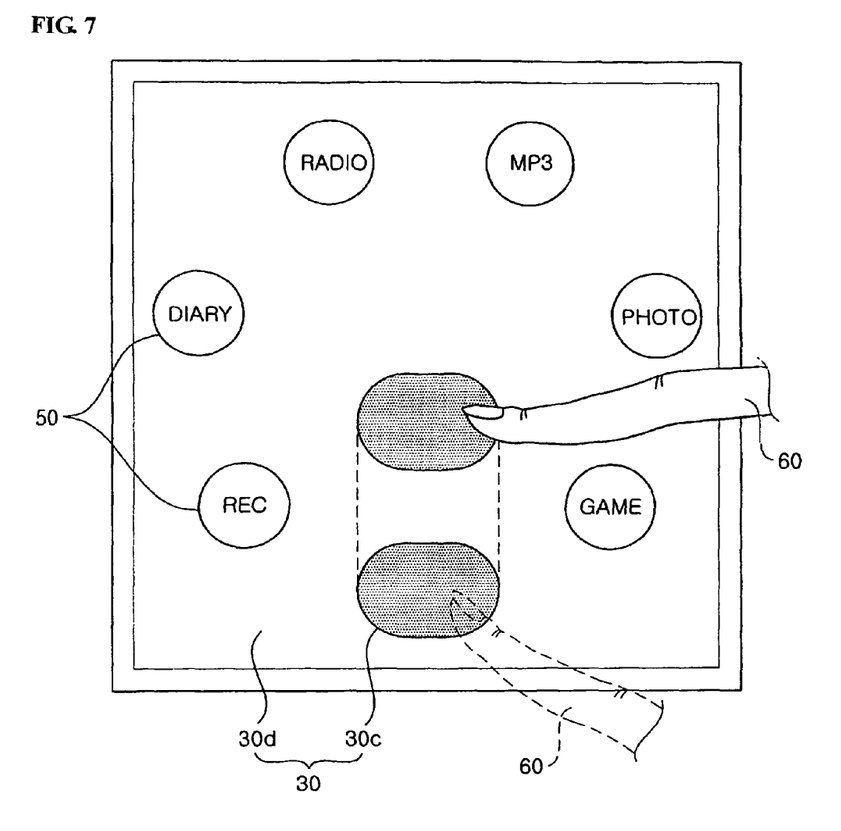
FIG. 7 is an exemplary view illustrating operations of a touch screen device according to an embodiment.

That is, as shown in FIG. 7, while the menu icons are displayed at fixed positions, the user may touch and drag the execution area onto a desired menu icon. That is, if the execution area is dragged onto the desired menu icon and the touch is then released, the menu included in the execution area may be executed. In order for the user to easily identify the execution area, the execution area may be displayed in a different color.

In a touch screen device and an operating method of a touch screen device according to embodiments as described above, at least the following advantageous effects may be expected.

That is, as described above, the probability of erroneously selecting and executing icons in a terminal device where a plurality of icons are densely arranged, due to a small screen size, may be minimized. Further, an icon operation may be performed as a user drags and moves a desired menu image. Therefore, product distinction effects may be expected due to a difference from a conventional method in which a desired icon is merely clicked to drive a relevant program. In addition, the screen touch device according to embodiments may be convenient to use since a user can cancel the execution of a selected menu while dragging a selected menu image.

According to one embodiment broadly described herein, a touch screen device is provided which includes a screen unit including a display unit for displaying menu images thereon and a detection unit for detecting a screen touch by a user, and a control unit for controlling operations of the device according to the screen touch detected by the detection unit, wherein the detection unit is divided, by the control unit, into an execution area configured to execute a menu when the menu placed on the execution area is touched, and a selection area configured to sequentially move the menu images to the execution area when the selection area is touched. When a touch is detected on the selection area, the control unit may cause the menu images to be continuously moved while the touch on the selection area is maintained.

According to another embodiment broadly described herein, there is provided a touch screen device, which includes a screen unit including a display unit for displaying menu images thereon and a detection unit for detecting a screen touch by a user, and a control unit for controlling operations of the device according to the screen touch detected by the detection unit, wherein the detection unit is divided, by the control unit, into a moving area configured to move a menu from a touch point along a drag line while the menu is dragged, and an execution area configured to execute the relevant menu when the touch on the execution area is released. The control unit may return the relevant menu to an initial position before the touch, when the touch is released from the moving area. The detection unit may be a resistive or capacitive touch screen.

According to a further embodiment broadly described herein, there is provided a method of operating a touch screen device in which a detection unit for detecting a screen touch by a user is divided into an execution area configured to execute a menu when the menu placed on the execution area is touched and a selection area configured to move menu images when the selection area is touched. The method includes recognizing the screen touch by the user, executing the relevant menu placed on a touch point when the touch point is within the execution area, and sequentially moving the menu images placed on the selection area to the execution area when the touch point is within the selection area. The menu images may be continuously moved while the touch on the selection area is maintained.

According to a still further embodiment, there is provided a method of operating a touch screen device in which a detection unit for detecting a screen touch by a user is divided into a moving area configured to move a menu from a touch point along a drag line while the menu is dragged and an execution area configured to execute the relevant menu when the touch on the execution area is released. The method may include recognizing the screen touch by the user, moving an image of the relevant menu along the drag line when the menu is dragged, and executing the relevant menu when the touch on the execution area is released. The method may further include returning the image of the relevant menu to an initial position before the touch, when the touch is released from the moving area.

According to a still further embodiment broadly described herein, there is provided digital equipment mounted with a touch screen device which includes a screen unit including a display unit for displaying menu images thereon and a detection unit for detecting a screen touch by a user, and a control unit for controlling operations of the device according to the screen touch detected by the detection unit, wherein the detection unit is divided, by the control unit, into an execution area configured to execute a menu when the menu placed on the execution area is touched, and a selection area configured to sequentially move the menu images to the execution area when the selection area is touched.

According to a still further embodiment broadly described herein, there is provided digital equipment mounted with a touch screen device which includes a screen unit including a display unit for displaying menu images thereon and a detection unit for detecting a screen touch by a user, and a control unit for controlling operations of the device according to the screen touch detected by the detection unit, wherein the detection unit is divided, by the control unit, into a moving area configured to move a menu from a touch point along a drag line while the menu is dragged, and an execution area configured to execute the relevant menu when the touch on the execution area is released.

Embodiments disclosed herein may prevent undesired menus from being inadvertently executed since the menus are executed only in a specific area.

According to another embodiment broadly disclosed herein, a touch screen device is provided that includes a screen including a display configured to display menu images thereon and a detector configured to detect a screen touch, and a controller configured to control operations of the touch screen device according to the screen touch detected by the detector, wherein the detector is divided by the controller into an execution area configured to execute a menu when the menu placed on the execution area is touched, and a selection area configured to sequentially move the menu images to the execution area when the selection area is touched. When a touch is detected on the selection area, the controller may cause the menu images to be continuously moved while the touch on the selection area is maintained. Further, the detector may be a resistive or capacitive touch screen. Furthermore, digital equipment may comprise the touch screen device. The digital equipment may comprise a MP3 player, a portable media player, a portable terminal, a navigation system, or a notebook computer.

According to another embodiment broadly disclosed herein, a touch screen device is provided that includes a screen including a display configured to display menu images thereon and a detector configured to detect a screen touch, and a controller configured to control operations of the touch screen device according to the screen touch detected by the detector, wherein the detector is divided by the controller into a moving area configured to move a menu from a touch point along a drag line while the menu is dragged, and an execution area configured to execute the relevant menu when the touch on the execution area is released. The controller may return the relevant menu to an initial position before the touch, when the touch is released from the moving area. Further, the detector may be a resistive or capacitive touch screen. Furthermore, digital equipment may comprise the touch screen device. The digital equipment may comprise a MP3 player, a portable media player, a portable terminal, a navigation system, or a notebook computer.

According to another embodiment broadly disclosed herein, a touch screen device is provided that includes a touch panel configured to detect a screen touch, a touch panel controller configured to signalize the touch detected on the touch panel and control the touch panel, a display configured to display images, a panel information storage device configured to store data of the touch panel, and a main controller configured to control operation of the touch panel controller and the display. The panel information storage device may store partition information of the touch panel divided into an execution area and a selection area. The partition information may be classified by operation mode. The panel information storage device may be a NOR flash memory.

Additionally, the device may further include a USB port connected to an external device configured to update or modify the partition information stored in the panel information storage device.

Also, the device may further comprise a data storage device configured to store data of the touch screen device, and a RAM configured to drive the touch screen device. A portion of the data storage device may be configured into the panel information storage device.

According to another embodiment broadly disclosed herein, a method of operating a touch screen device is provided in which a detector, configured to detect a screen touch is divided into an execution area configured to execute a menu when the menu placed on the execution area is touched and a selection area configured to move menu images when the selection area is touched, the method including recognizing the screen touch, executing a relevant menu placed on a touch point when the touch point is within the execution area, and sequentially moving menu images placed on the selection area to the execution area when the touch point is within the selection area. The menu images may be continuously moved while the touch on the selection area is maintained. A method of operating digital equipment having a touch screen device may comprise the method. The digital equipment may comprise a MP3 player, a portable media player, a portable terminal, a navigation system, or a notebook computer.

According to another embodiment broadly disclosed herein, a method of operating a touch screen device is provided in which a detector configured to detect a screen touch is divided into a moving area configured to move a menu from a touch point along a drag line while the menu is dragged and an execution area configured to execute a relevant menu when the touch on the execution area is released, the method comprising recognizing the screen touch, moving an image of the relevant menu along the drag line when the menu is dragged, and executing the relevant menu when the touch on the execution area is released. The method may further comprise returning the image of the relevant menu to an initial position before the touch, when the touch is released from the moving area. A method of operating digital equipment having a touch screen device may comprise the method. The digital equipment may comprise a MP3 player, a portable media player, a portable terminal, a navigation system, or a notebook computer.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to affect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this invention. More particularly, reasonable variations and modifications are possible in the component parts and/or arrangements of the subject combination arrangement within the scope of the foregoing disclosure, the drawings and the appended claims without departing from the spirit of the disclosure. In addition to variations and modifications in the component parts and/or arrangements, alternative uses will also be apparent to those skilled in the art.

What is claimed is:

1. A method of operating a touch screen device having a touch screen having a first area and a second area, the method comprising:
    displaying a plurality of menu images corresponding to a plurality of menus in the first area;
    moving a selected one of the plurality of menu images displayed in the first area into the second area when the first area is touched; and
    executing a menu corresponding to the selected menu image when the second area is touched, wherein when the selected one of the plurality of menu images displayed in the first area is moved into the second area, a menu image previously located in the second area pops out of the second area and returns to its original location in the first area.

2. A method of operating a touch screen device having a touch screen having a first area and a second area, the method comprising:
    displaying a plurality of menu images corresponding to a plurality of menus in the first area;
    moving a selected one of the plurality of menu images displayed in the first area into the second area when the first area is touched; and
    executing a menu corresponding to the selected menu image when the second area is touched, wherein while the touch is maintained in the first area, the plurality of menu images is continuously moved in a clockwise or counterclockwise direction.

3. A touch screen device, comprising:
    a touch screen having a first area and a second area; and
    a controller configured to display a plurality of menu images corresponding to a plurality of menus in the first area, to move a selected one of the plurality of menu images displayed in the first area into the second area when the first area is touched, and to execute a menu corresponding to the selected menu image when the second area is touched, wherein when the selected one of the plurality of menu images displayed in the first area is moved into the second area, a menu image previously located in the second area pops out of the second area and returns to its original location in the first area.

4. A touch screen device, comprising:
    a touch screen having a first area and a second area; and
    a controller configured to display a plurality of menu images corresponding to a plurality of menus in the first area, to move a selected one of the plurality of menu images displayed in the first area into the second area when the first area is touched, and to execute a menu corresponding to the selected menu image when the second area is touched, wherein the controller continuously moves the plurality of menu images in a clockwise or counterclockwise direction while the touch is maintained in the first area.

5. A method of operating digital equipment having a touch screen device, comprising the method of claim 1.

6. A method of operating digital equipment having a touch screen device, comprising the method of claim 2.

7. The method of claim 6, wherein the digital equipment comprises a MP3 player, a portable media player, a portable terminal, a navigation system, or a notebook computer.

8. The touch screen device of claim 3, wherein the touch screen is a resistive or capacitive touch screen.

9. Digital equipment comprising the touch screen device of claim 3.

10. The digital equipment of claim 8, wherein the digital equipment comprises a MP3 player, a portable media player, a portable terminal, a navigation system, or a notebook computer.

11. The touch screen device of claim 4, wherein the touch screen is a resistive or capacitive touch screen.

12. Digital equipment comprising the touch screen device of claim 4.

13. The digital equipment of claim 12, wherein the digital equipment comprises a MP3 player, a portable media player, a portable terminal, a navigation system, or a notebook computer.

* * * * *